United States Patent [19]

Kash

[11] Patent Number: 4,531,861
[45] Date of Patent: Jul. 30, 1985

[54] ADHESIVELY SECURED ANCHOR ROD

[76] Inventor: Maurice D. Kash, P.O. Box 874, Broken Arrow, Okla. 74012

[21] Appl. No.: 523,117

[22] Filed: Aug. 15, 1983

[51] Int. Cl.³ ............................................. E21D 20/02
[52] U.S. Cl. ..................................... 405/261; 52/704; 405/259
[58] Field of Search ....................... 405/259, 260, 261; 52/698, 704

[56] References Cited

U.S. PATENT DOCUMENTS

| | | | |
|---|---|---|---|
| 3,222,873 | 12/1965 | Williams | 405/260 |
| 3,693,359 | 9/1972 | Karara | 405/259 |
| 3,940,941 | 3/1976 | Libert et al. | 405/261 |
| 4,295,761 | 10/1981 | Hansen | 405/261 |
| 4,372,708 | 2/1983 | Bower et al. | 405/260 X |
| 4,386,877 | 6/1983 | McDowell | 405/260 X |
| 4,393,638 | 7/1983 | Sell et al. | 405/261 X |

Primary Examiner—Dennis L. Taylor
Attorney, Agent, or Firm—Head, Johnson & Stevenson

[57] ABSTRACT

An adhesively secured anchor rod for installation in a bore of a concrete base, pad, or the like, and comprising a bar having a first threaded portion of a standard thread provided at one end thereof, a second threaded portion of a coarse or coil thread provided at the opposite end thereof, and an intermediate threaded portion of a coarse or coil thread interposed therebetween, the length of the first threaded portion being selected to provide a gauge for determining the depth of embedding for the anchor rod within the concrete base, and the direction of the threads of the second threaded portion and intermediate portion being reversed with respect to each other for facilitating mixing of the components of an adhesive material placed within the bore and increasing resistance of the anchor rod against accidental "backing out" of the rod from the bore subsequent to installation thereof, the outer end of the second threaded portion being provided with recesses for facilitating the entering of the adhesive material into the threaded portion during the mixing thereof as the anchor rod is inserted into the bore in a twisting and downward movement.

3 Claims, 5 Drawing Figures

U.S. Patent  Jul. 30, 1985  4,531,861
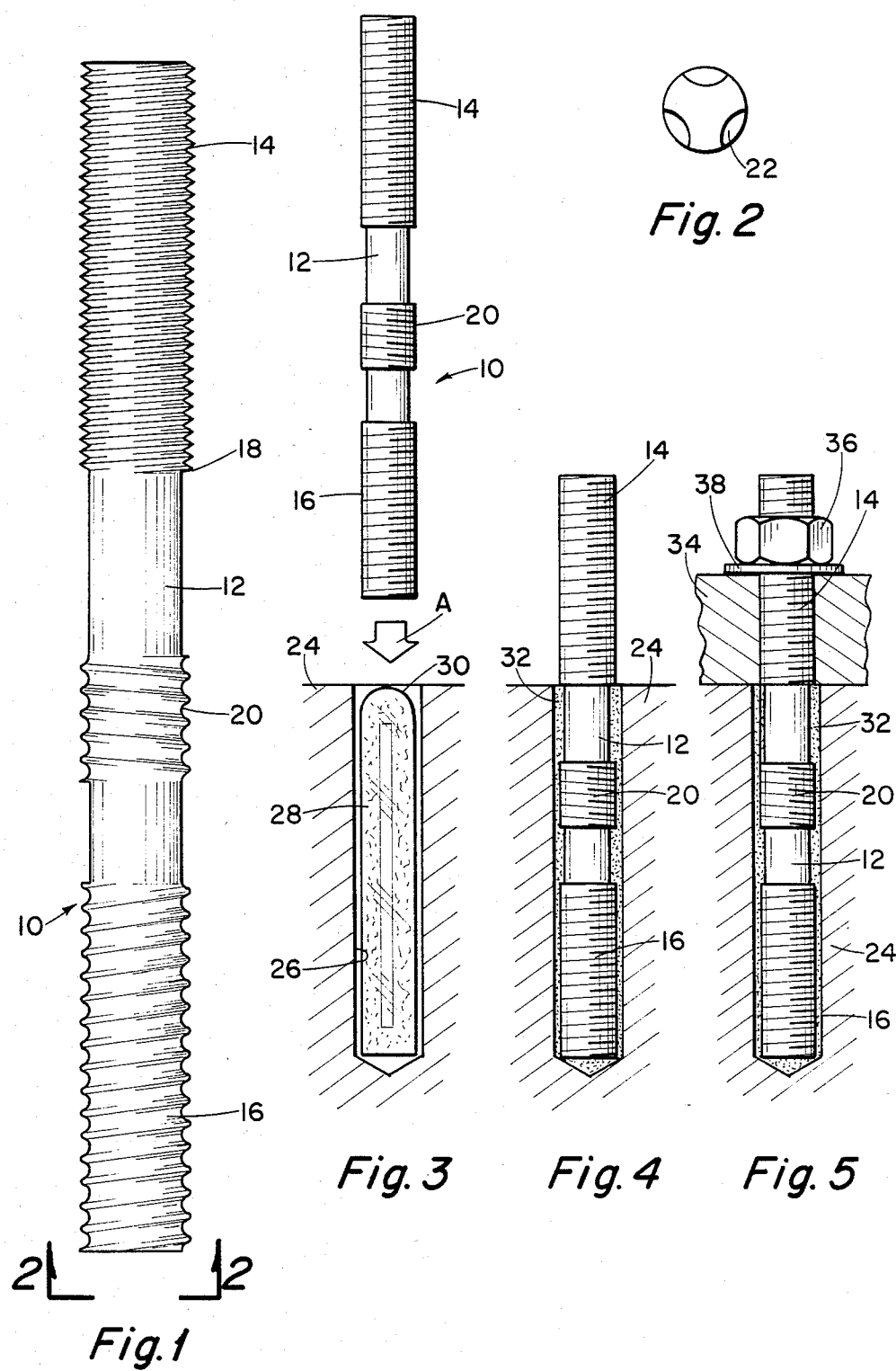

ADHESIVELY SECURED ANCHOR ROD

BACKGROUND OF THE INVENTION

1. Field of the Invention

This invention relates to improvements in anchoring rods installed in poured concrete, and the like, and more particularly, but not by way of limitation, to adhesively secured or grout-in anchor rods embedded in concrete or the like.

2. Description of the Prior Art

The anchoring of rods in poured concrete structure, such as a concrete pad, or the like, has long been a problem, and the use of adhesively secured anchor rods in such installations is a relatively new innovation in the art. The adhesively secured anchor rod system as presently available normally comprises the drilling of a bore in the concrete structure wherein the anchor is to be set. A sealed capsule of adhesive material is inserted or dropped into the bore, the sealed capsule usually containing the two components of the adhesive material. The anchor rod is inserted into the bore having the capsule deposited therein, and the rod is moved longitudinally into or through the bore in a twisting motion whereby the capsule is broken and the two ingredients contained therein are stirred together as the anchor rod moves downwardly in the bore. One such system incorporates the use of Parabond capsule anchors (Parabond is a trademark of Emhart) and is shown in advertising brochures of Molly Division Headquarters, the brochures being dated March, 1980. A clamping member for an adhesively secured anchor rod is shown in the Schiefer et al U.S. Pat. No. 4,193,256, and the Rausch U.S. Pat. No. 4,129,007 relates to an adhesively secured anchor of the type in use today. The Wiggill U.S. Pat. No. 3,925,996 discloses an anchoring resin cartridge system which may be utilized in the adhesively secured anchor rod systems. Other rod anchoring systems or devices are available, such as that shown in the Schuermann et al U.S. Pat. No. 3,188,815 and the reissue U.S. Pat. No. Re. 25,860 corresponding thereto. The device disclosed in the Schuermann et al patent includes an anchor bolt having threads in combination with an expanding sleeve, but is in an entirely different environment and for a completely different purpose than the adhesively secured anchor rods.

The presently available devices and systems for adhesively anchoring rods in a concrete base, or the like, have certain disadvantages in that it is frequently difficult to ascertain the depth of embedding of the anchor rod, and the usual threaded portion of the anchor rod disposed within the concrete may pull out of engagement therewith upon the application of sufficient longitudinal force on the exposed portion of the rod. In addition, the usual threaded portion of the anchor rod which is disposed within the bore is frequently of a relatively fine thread size and may not provide an efficient mixing of the ingredients of the adhesive, resulting in a reduction of the effectiveness of the adhesive material whereby the anchor rod may "back out" of the bore.

SUMMARY OF THE PRESENT INVENTION

The present invention contemplates a novel adhesively secured or grout-in anchor rod which has been particularly designed and constructed for overcoming the foregoing disadvantages. The novel anchor rod comprises a bar having a standard roll formed threaded portion provided at one end thereof extending throughout a sufficient length on the bar whereby the last thread may be utilized as a gauge or mark for the length of embedding of the bar in the concrete base, or the like. A roll formed coarse thread, coil thread, or the like, is provided at the opposite end of the bar, and preferably extends longitudinally through a length substantially equal to the length of the standard threaded portion. The coarse threaded portion of the bar is adapted to be inserted into the bore provided in the base or structure wherein the anchor rod is to be installed, and the configuration and/or size of the coarse thread, coil thread, or the like, provides a more efficient mixing of the ingredients of the adhesive capsule placed in the bore prior to insertion of the bar or anchor rod therein. In addition, the coarse thread has a larger major diameter than the shank of the bar which greatly increases resistance of the rod to any accidental withdrawal from its installed position. It may also be desirable to provide a secondary coarse or coil threaded portion in spaced relation on the bar with respect to the primary coarse thread to improve or increase the resistance to withdrawal of the rod from the bore. In such an event, it may also be preferable to provide reverse threading between the two sets of coil or coarse threads. For example, the primary coarse threaded portion may be a right hand thread and the secondary coarse threaded portion may be a left hand thread. It is also preferable to provide a slight taper at the insertion end of the bar, the taper being created by a plurality of circumferentially spaced peripheral recesses or indented areas. This slight taper provides a starting point or element for the components of the adhesive material to enter the coarse or coil threaded portion of the bar. The novel anchor rod is simple and efficient in operation and economical and durable in construction.

BRIEF DESCRIPTION OF THE DRAWINGS

FIG. 1 is a side elevational view of an anchor rod emboyding the invention.

FIG. 2 is a view taken on line 2—2 of FIG. 1.

FIG. 3 is a sectional elevational view of an initial step in the installation of an anchor rod embodying the invention in a concrete base, or the like, with the anchor rod shown in elevation for purposes of illustration.

FIG. 4 is a view similar to FIG. 3, illustrating a subsequent step in the installation of an anchor rod embodying the invention.

FIG. 5 is a view similar to FIGS. 3 and 4, and illustrates a final step in the installation of an anchor rod embodying the invention.

DETAILED DESCRIPTION OF THE PREFERRED EMBODIMENT OF THE INVENTION

Referring to the drawing in detail, reference character 10 generally indicates an anchor rod comprising an elongated bar 12 having a first threaded portion 14 provided at one end thereof and a second threaded portion 16 provided at the opposite end thereof in spaced relation with respect to the first portion 14. The threaded portion 14 is preferably of a standard roll thread corresponding to or complementary with equipment (not shown) to be secured to the anchor rod 10 subsequent to installation thereof as will be hereinafter set forth. In addition, the overall length of the threaded portion 14 is preferably such that the last or innermost thread 18 thereof is longitudinally positioned on the bar 12 at a particularly selected position in accordance with the desired ultimate depth of embedding of the anchor rod 10 during an installation operation. The threaded portion 16 is preferably of a coarse or coil thread, the major diameter thereof being substantially greater than the diameter of the bar 12, as particularly shown in FIG. 1. It is preferable that the overall length of the threaded portion 16 be substantially equal to the overall length of the threaded portion 14, but not limited thereto.

An intermediate or secondary threaded portion 20 of a coarse or coil thread may be interposed between the threaded portions 14 and 16, and it may be preferable to provide a reverse threaded direction for the threads 16 and 20. For example, the threaded portion 16 may be a right hand thread and the threaded portion 20 may be a left hand thread. The outer end of the threaded portion 16 is provided with a plurality of circumferentially spaced indentations or recesses 22, as particularly shown in FIG. 2, providing a slight taper at the outer end of the threaded portion 16 for a purpose as will be hereinafter set forth. Of course, it will be apparent that the threads of the threaded portion 16 may be intermittently interrupted if desired, to increase resistance against "backing out" of the bore 26.

In order to install the anchor rod 10 in a concrete pad, base or the like 24, it is the usual practice to drill a longitudinally extending bore 26 therein having the outer end thereof open to the atmosphere or surrounding area. Of course, the bore 26 is drilled in accordance with the proper size and depth in accordance with the overall size of the anchor rod 10 being utilized in connection therewith. It is preferable to clean dust and debris from the bore 26 prior to continuing the installation operation, but not limited thereto. This may be accomplished by injecting compressed air, or the like, into the bore for dislodging any loosened or unwanted debris therefrom. A suitable adhesive containing capsule 28, such as that sold under the aforementioned trademark Parabond, may be inserted into the hole and it is preferable that the capsule 28 be positioned in the bore 26 in such a manner that the rounded end 30 thereof extends upwardly in the bore 26 as particularly shown in FIG. 3. The anchor tool or rod 10 may then be positioned above the bore 26 in substantial axial alignment with respect thereto, and may be initially moved downwardly toward the bore as indicated by the arrow A in FIG. 3. The threaded portion 16 is positioned substantially immediately above the bore 26 in order that the threaded portion 16 may be inserted therein for an initial engagement with the capsule 30.

The threaded end 16 may then be forced downwardly through the bore 26 by a twisting motion for breaking the capsule 30 and releasing the ingredients of the adhesive therefrom for injection thereof into the bore 26 below and surrounding the threads 16 as shown at 32 in FIGS. 4 and 5. The twisting and downward movement of the rod 10 may be continued until the lower thread 18 of the threaded portion 14 is in the proximity of or in engagement with the outer surface of the concrete base 24, as shown in FIG. 4. The twisting action of the large coarse or coil threads 16 provides an efficient mixing of the ingredients of the adhesive material, and the recesses 22 facilitating the upward movement of the adhesive 32 into and around the threads 16 as the rod moves downwardly through the bore 26. It is to be noted that both the threaded portion 16 and the threaded portion 20 are contained within the bore 26 when the thread 18 of the threaded portion 14 has moved into the engagement with or proximity of the outer surface of the base 24. The left hand threads of the portion 20 cooperate with the right hand threads of the portion 16 for efficiently mixing the ingredients of the adhesive 32 throughout the length of the bore 26 by forcing the adhesive components in a downward direction as the right hand threads 16 force the component in an upward direction. In addition, the left hand coarse or coil threads 20 increase resistance of the anchor rod 10 against backing out of the bore 26.

When the anchor rod 10 has thus been installed within the bore 26, it is preferable to permit the adhesive material 26 sufficient time for curing before proceeding with the attachment of any other object to the protruding threaded portion 14. When the adhesive 32 has sufficiently cured, any suitable load or object 34 may be placed against the outer surface of the base 24, with the threaded portion 14 extending therethrough, as shown in FIG. 5. A suitable nut 36 may be threadedly engaged with the protruding end of the threaded portion 14, outboard of the object 34, and a lock washer 38, or the like, may be interposed between the nut 36 and the object 34, as is well known. As hereinbefore set forth, the reverse threaded portion 20 adds resistance to any tendency of the anchor rod 10 to "back out" of the bore 26 in the event the nut 36 is removed from engagement with the threads 14 for any reason, such as for removal or replacement of the object 34.

From the foregoing it will be apparent that the present invention provides a novel adhesively secured anchor rod comprising a first threaded portion of a standard thread, the standard threaded portion being of a length for facilitating gauging of the depth of embedding of the rod, and a second threaded portion having coarse or coil threads provided therefor. The second threaded portion is adapted for insertion within the bore of a concrete pad or base or the like for fracturing an adhesive capsule to release the adhesive ingredients or components therefrom. The coarse threads moving downwardly through the bore in a twisting action efficiently mix the components of the adhesive material within the bore, and recess means provided at the outer end of the embedded portion of the anchor rod facilitating the entry of the adhesive material into the threads during the mixing process. It is preferable to provide an intermediate threaded portion of coarse threads for cooperating with the other coarse threaded portion in the adhesive mixing operation and for increasing resistance of the anchor against "backing out" of the bore subsequent to the installation of the anchor rod therein.

Whereas the present invention has been described in particular relation to the drawings attached hereto, it should be understood that other and further modifications, apart from those shown or suggested herein may be made within the spirit and scope of this invention.

What is claimed is:

1. An adhesively secured anchor rod for installation within an adhesive containing bore of a base structure, and comprising a bar having a first threaded portion provided at one end thereof and a second threaded portion provided at the opposite end thereof, an intermediate threaded portion interposed between the first and second threaded portions, the first threaded portion comprising standard threads and the second threaded portion and intermediate threaded portion comprising a relatively large thread, the second threaded portion being adapted for initial insertion into the adhesive containing bore for effeciently mixing the adhesive within the bore and around the second and intermediate threaded portions in order to securely retain the second and intermediate threaded portions embedded with the adhesive containing bore, wherein the direction of the threads of the intermediate threaded portion is opposite the direction of the threads of the second threaded portion for resisting accidental backing out of the anchor rod.

2. An adhesively secured anchor rod as set forth in claim 1 wherein the length of the first threaded portion is selected in order to provide a gauge for the depth of embedding of the anchor rod within the adhesive containing bore.

3. An adhesively secured anchor rod as set forth in claim 1 wherein the outer end of the second threaded portion is provided with recess means for facilitating movement of the adhesive in the second threaded portion during the mixing of the adhesive within the bore.

* * * * *